(12) United States Patent
Shirabe et al.

(10) Patent No.: US 12,259,023 B2
(45) Date of Patent: Mar. 25, 2025

(54) SPIRAL ADVANCE/RETREAT ACTUATION DEVICE

(71) Applicant: TOYOTA JIDOSHA KABUSHIKI KAISHA, Toyota (JP)

(72) Inventors: Takeo Shirabe, Susono (JP); Takatoshi Morimitsu, Toyota (JP); Hirotaka Komura, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/439,880

(22) Filed: Feb. 13, 2024

(65) Prior Publication Data

US 2024/0344596 A1   Oct. 17, 2024

(30) Foreign Application Priority Data

Apr. 14, 2023   (JP) ................................. 2023-066611

(51) Int. Cl.
  *F16H 19/06*   (2006.01)
  *B65H 75/44*   (2006.01)
(52) U.S. Cl.
  CPC ..... *F16H 19/0618* (2013.01); *B65H 75/4471* (2013.01); *B65H 2601/521* (2013.01)

(58) Field of Classification Search
  CPC ............. F16H 19/0618; F16H 19/0663; F16H 19/0654; F16H 19/064; F16H 19/0645; F16H 2019/0667; B25J 18/02; B25J 18/04
  See application file for complete search history.

(56) References Cited

U.S. PATENT DOCUMENTS

2021/0194388 A1*  6/2021  Iwamoto ................ H02N 2/025
2021/0341040 A1* 11/2021  Komura .................... F16H 9/26
2021/0341041 A1* 11/2021  Iwamoto ............. F16H 19/0618
2023/0417308 A1* 12/2023  Komura .................. F16H 25/20

FOREIGN PATENT DOCUMENTS

JP           4607772 B2      1/2011

* cited by examiner

*Primary Examiner* — William C Joyce
*Assistant Examiner* — Gregory T Prather
(74) *Attorney, Agent, or Firm* — SoraIP, Inc

(57) ABSTRACT

The spiral advance/retreat actuation device includes a first strip material, a second strip material, an inner guide member as a strip material guide unit, an outer cylindrical wall, and a strip material storage container. The strip material storage container includes a first storage chamber that spirally stores a first strip material that has transitioned from a cylindrical configuration state to a separated state, and a second storage chamber that spirally stores a second strip material that has transitioned from a cylindrical configuration state to a separated state. The inner bottom surface of the first storage chamber and the inner bottom surface of the second storage chamber are sloped so as to descend as they move away from the axis.

5 Claims, 4 Drawing Sheets

SPIRAL ADVANCE/RETREAT ACTUATION DEVICE

CROSS-REFERENCE TO RELATED APPLICATION

This application claims priority to Japanese Patent Application No. 2023-066611 filed on Apr. 14, 2023, incorporated herein by reference in its entirety.

BACKGROUND

1. Technical Field

The present disclosure relates to a spiral advance/retreat actuation device.

2. Description of Related Art

Japanese Patent No. 4607772 discloses a spiral advance/retreat actuation device that includes a first strip material including a first engagement structure along the extension direction in each of an upper edge side portion and a lower edge side portion, and a second strip material including a second engagement structure along the extension direction in each of an upper edge side portion and a lower edge side portion, the second engagement structure being configured to be removably engageable with the first engagement structure. The first strip material and the second strip material are each wound spirally around a common axis in a state shifted from each other in a direction of the axis to constitute a cylindrical structure in which the first engagement structure in the upper edge side portion of the first strip material and the second engagement structure in the lower edge side portion of the second strip material are engaged with each other in such a manner as to retain the two strip materials in a direction of overlapping surfaces and the first engagement structure in the lower edge side portion of the first strip material and the second engagement structure in the upper edge side portion of the second strip material are engaged with each other in such a manner as to retain the two strip materials in a direction of overlapping surfaces with an inner surface of the upper edge side portion of the first strip material and an outer surface of the lower edge side portion of the second strip material partially overlapping each other in the direction of the axis and with an inner surface of the lower edge side portion of the first strip material and an outer surface of the upper edge side portion of the second strip material partially overlapping each other in the direction of the axis. The spiral advance/retreat actuation device further includes a strip material guide unit configured to enable the first strip material and the second strip material to transition between a separated state, in which the first strip material and the second strip material are separated from each other, and a cylindrical configuration state, in which the first strip material and the second strip material constitute the cylindrical structure, using a guide structure that guides the first strip material and the second strip material in a spiral manner.

SUMMARY

In the spiral advance/retreat actuation device according to Japanese Patent No. 4607772, noise is generated when the first strip material and the second strip material transition from the cylindrical configuration state to the separated state.

An object of the present disclosure is to provide a technique of suppressing noise generated when a first strip material and a second strip material transition from a cylindrical configuration state to a separated state.

An aspect of the present disclosure provides a spiral advance/retreat actuation device including: a first strip material including a first engagement structure along an extension direction in each of an upper edge side portion and a lower edge side portion; a second strip material including a second engagement structure along an extension direction in each of an upper edge side portion and a lower edge side portion, the second engagement structure being configured to be removably engageable with the first engagement structure; a strip material guide unit; and a strip material storage container, in which: the first strip material and the second strip material are each wound spirally around a common axis in a state shifted from each other in a direction of the axis to constitute a cylindrical structure in which the first engagement structure in the upper edge side portion of the first strip material and the second engagement structure in the lower edge side portion of the second strip material are engaged with each other in such a manner as to retain the first strip material and the second strip material in a direction of overlapping surfaces and the first engagement structure in the lower edge side portion of the first strip material and the second engagement structure in the upper edge side portion of the second strip material are engaged with each other in such a manner as to retain the first strip material and the second strip material in a direction of overlapping surfaces with an inner surface of the upper edge side portion of the first strip material and an outer surface of the lower edge side portion of the second strip material partially overlapping each other in the direction of the axis and with an inner surface of the lower edge side portion of the first strip material and an outer surface of the upper edge side portion of the second strip material partially overlapping each other in the direction of the axis; the strip material guide unit is configured to guide the first strip material and the second strip material in a spiral manner, and enable the first strip material and the second strip material to transition between a separated state in which the first strip material and the second strip material are separated from each other and a cylindrical configuration state in which the first strip material and the second strip material constitute the cylindrical structure; the strip material storage container includes a first storage chamber that spirally stores the first strip material that has transitioned from the cylindrical configuration state to the separated state, and a second storage chamber that spirally stores the second strip material that has transitioned from the cylindrical configuration state to the separated state; and an inner bottom surface of at least one of the first storage chamber and the second storage chamber is inclined downward as the inner bottom surface extends away from the axis. According to the above configuration, it is possible to suppress noise generated when the first strip material and the second strip material transition from the cylindrical configuration state to the separated state. The inner bottom surface may be inclined so as not to come into contact with a corresponding strip material. According to the above configuration, it is possible to reliably suppress noise generated when the first strip material and the second strip material transition from the cylindrical configuration state to the separated state. The strip material guide unit may include an inner guide member that guides the first strip material and the second strip material in a spiral manner, and an outer cylindrical wall disposed on an outer peripheral side of the inner guide member to guide the first strip material and the second strip material so as to enable the first strip material and the second strip material to transition between the separated state and the cylindrical configuration state; and the outer cylindrical wall may have a first introduction port for introducing the first strip material from the first storage chamber into an opposing gap between the inner guide member and the outer cylindrical wall, and a second introduction port for introducing the second strip material from the second storage chamber into the opposing gap. According to the above configuration, the strip material guide unit can be implemented with a simple configuration. Both the first introduction port and the second introduction port may extend linearly in parallel with the axis. According to the above configuration, the strip material guide unit can be implemented with a simple configuration. An inclination angle of the inner bottom surface of the first storage chamber in a sectional surface of the strip material storage container taken along a direction of a tangent to the first introduction port in plan view may be larger than a lead angle of the cylindrical structure, or an inclination angle of the inner bottom surface of the second storage chamber in a sectional surface of the strip material storage container taken along a direction of a tangent to the second introduction port in plan view may be larger than the lead angle of the cylindrical structure. According to the above configuration, it is possible to reliably suppress noise generated when the first strip material and the second strip material transition from the cylindrical configuration state to the separated state.

According to the present disclosure, it is possible to suppress noise generated when a first strip material and a second strip material transition from a cylindrical configuration state to a separated state.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
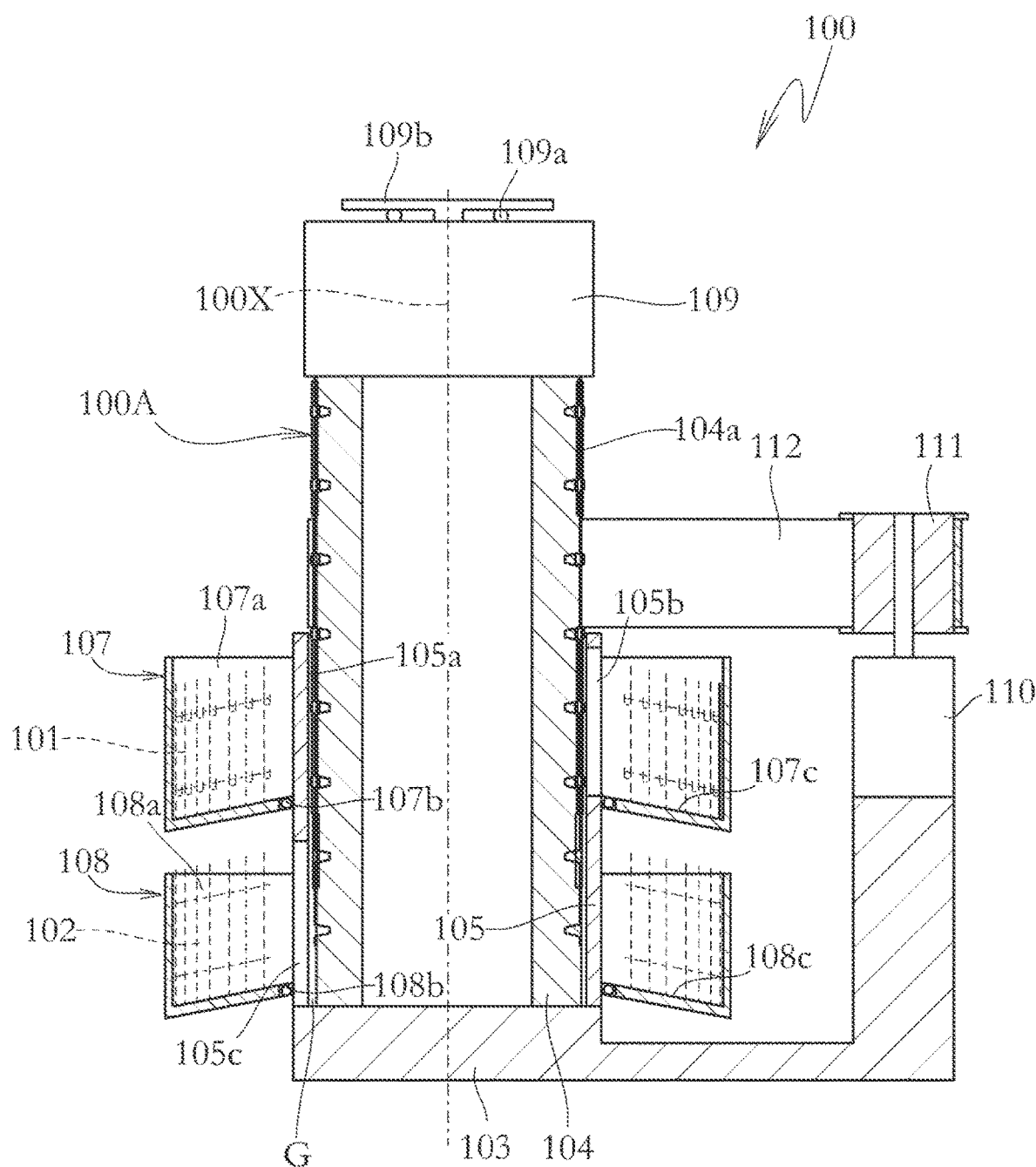
FIG. 1 is a schematic longitudinal cross-sectional view showing the overall configuration of a spiral advance/retreat actuation device.
Figure 2:
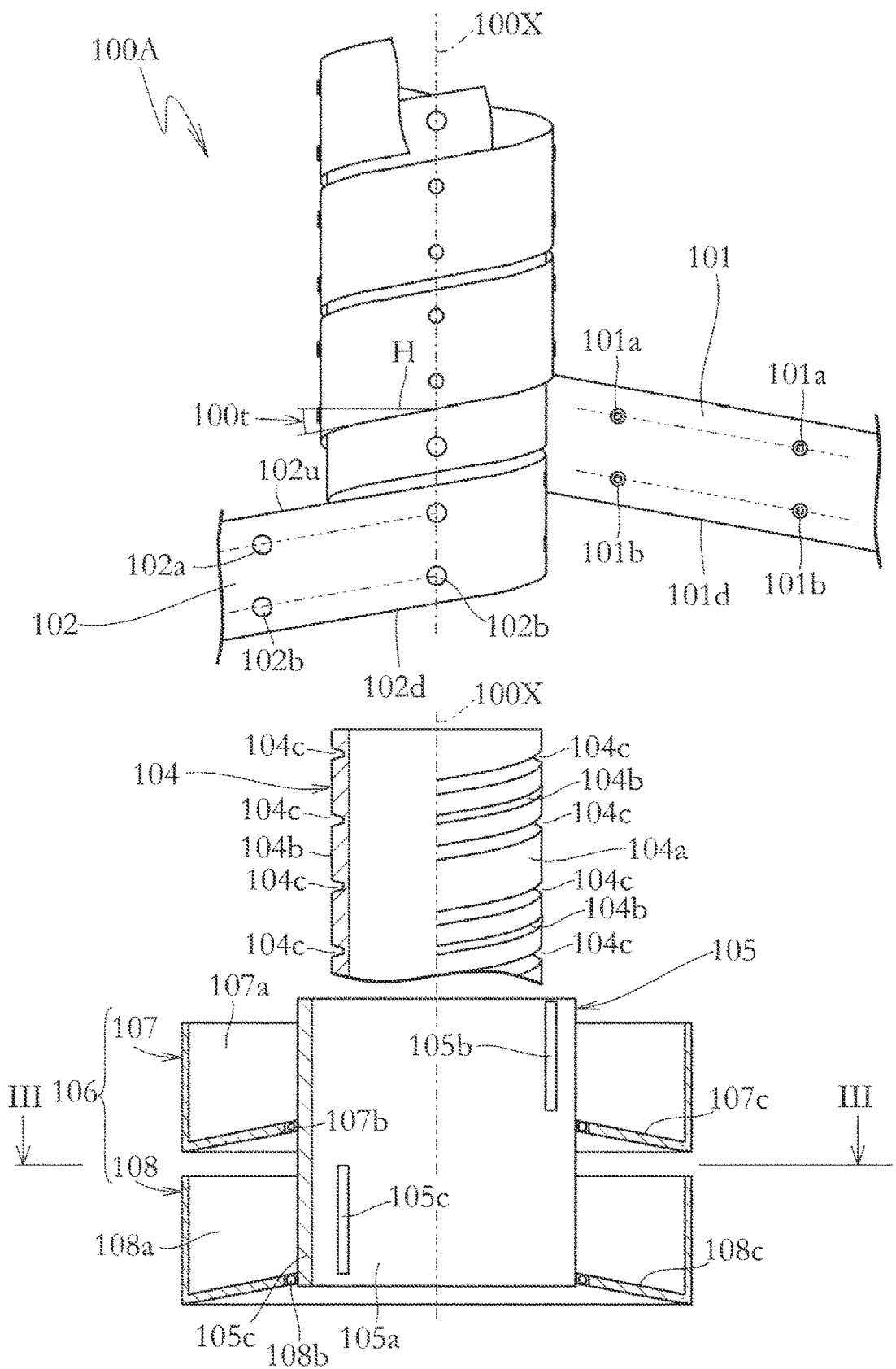
FIG. 2 is an exploded perspective view of the spiral advance/retreat actuation device.

Embodiments of the present disclosure will be described below along with illustrated examples. As shown in FIGS. 1 and 2, the spiral advance/retreat actuation device 100 includes a first strip material 101 and a second strip material 102 each having a strip shape. The cylindrical structure 100A is constructed by spirally winding the first strip material 101 and the second strip material 102 around the axis 100X at positions shifted from each other in the direction of the axis 100X. At this time, in the cylindrical structure 100A, the first strip material 101 is wound around the outside of the second strip material 102. Specifically, the upper edge side portion of the first strip material 101 overlaps the lower edge side portion of the second strip material 102 arranged above it from the outside, and the upper edge side of this second strip material 102 This portion overlaps the lower edge side portion of the first strip material 101 located above it from the inside. That is, the cylindrical structure 100A is configured by the first strip material 101 and the second strip material 102 that are respectively wound helically and alternately partially overlapping in the direction of the axis 100X.

The first strip material 101 and the second strip material 102 are configured of, for example, a band material (belt) having appropriate flexibility and elasticity. As the constituent material of this band material, a material with relatively high rigidity such as a metal plate or a hard synthetic resin plate is preferably selected, and the above-mentioned cylindrical structure 100A can be constructed by forming such a material thinly. A certain degree of flexibility is ensured so that a curved state can be easily obtained.

As shown in FIG. 2, engagement pins 101a and 101b are provided on the upper edge side and lower edge side of the first strip material 101, respectively, so as to protrude radially inward. A plurality of these engagement pins 101a and 101b are preferably formed periodically at appropriate intervals in the extending direction of the first strip material 101. In the illustrated example, the bases of the engagement pins 101a and 101b are fixed by caulking, welding, welding, adhesion, etc. while penetrating the first strip material 101.

An engagement pin 101a and an engagement pin 101b are provided on the upper edge side and the lower edge side of the second strip material 102 at positions corresponding to the engagement pins 101a and 101b of the first strip material 101. An engagement hole 102a and an engagement hole 102b configured to be able to be engaged and detached are provided, respectively. These engagement holes 102a and engagement holes 102b are also preferably formed in plural numbers periodically at appropriate intervals in the extending direction of the second strip material 102, similarly to the engagement pins 101a and 101b.

In the cylindrical structure 100A, in the region where the upper edge side portion of the first strip material 101 and the lower edge side portion of the second strip material 102 arranged above the said portion overlap, the engagement pin 101a and the engagement hole 102b engage, and in the region where the upper edge side portion of the second strip material 102 and the lower edge side portion of the first strip material 101 disposed above the said portion overlap, the engagement hole 102a and the engagement pin 101b engage with each other. As a result, the first strip material 101 and the second strip material 102 are fixed to each other in all directions on the overlapping surfaces, thereby maintaining the shape of the cylindrical structure 100A. In this way, in the cylindrical structure 100A, the first strip material 101 and the second strip material 102 that are adjacent to each other are all partially overlapped, and the overlapping surface portions are fixed to each other by the engagement structure. Therefore, it has high rigidity close to that of an integral cylindrical member.

In this embodiment, the engagement pin 101a and the engagement pin 101b are a specific example of the first engagement structure. The engagement hole 102a and the engagement hole 102b are a specific example of the second engagement structure.

As shown in FIG. 1, a base 103 is provided at the bottom of the spiral advance/retreat actuation device 100, and an inner guide member 104 having a cylindrical inner guide surface 104a is fixed onto the base 103. This inner guide surface 104a is constituted by the cylindrical outer peripheral surface of the inner guide member 104. As shown in FIG. 2, the inner guide surface 104a is provided with a spiral guide rib 104b and a guide groove 104c. In the illustrated example, two spiral guide ribs 104b and two spiral guide grooves 104c are formed on the inner guide surface 104a. The guide rib 104b engages with the upper edge 102u and lower edge 102d of the second strip material 102, thereby guiding the second strip material 102 in a spiral shape. Further, the engagement pin 101a and the engagement pin 101b protruding from the inner surface of the first strip material 101 penetrate the engagement hole 102a and the engagement hole 102b, respectively, and engage with the guide groove 104c. Therefore, the first strip material 101 is guided in a spiral together with the second strip material 102.

Returning to FIG. 1, an outer cylindrical wall 105 having a cylindrical outer guide surface 105a is fixed on the base 103. This outer guide surface 105a is constituted by the cylindrical inner peripheral surface of the outer cylindrical wall 105. The outer guide surface 105a is arranged to face the inner guide surface 104a of the inner guide member 104 in the radial direction. The opposing gap G between the inner guide surface 104a and the outer guide surface 105a can accommodate the first strip material 101 and the second strip material 102 in an overlapping manner, and the engagement pin 101a and the engagement pin 101b can be engaged with each other. The dimensions are such that the fitting state of the engagement hole 102a and the engagement hole 102b can be maintained. Note that the opposing gap G between the inner guide surface 104a and the outer guide surface 105a means a space sandwiched between the inner guide surface 104a and the outer guide surface 105a in the radial direction.

As shown in FIGS. 1 and 2, the outer cylindrical wall 105 has a first introduction port 105b for introducing the first strip material 101 into the opposing gap G, and a second introduction port 105c for introducing the second strip material 102 into the opposing gap G. The first introduction port 105b and the second introduction port 105c have a slit shape having an opening cross section corresponding to the cross section shape thereof so that the first strip material 101 and the second strip material 102 can be inserted therethrough, respectively. As shown in FIG. 2, the first introduction port 105b and the second introduction port 105c both extend linearly parallel to the axis 100X.

Further on the outer peripheral side of the outer cylindrical wall 105, a strip material storage container 106 is provided which is rotatably supported with respect to the outer cylindrical wall 105. The strip material storage container 106 includes a first storage container 107 having a first storage chamber 107a that can accommodate the first strip material 101, and a second storage container 108 that has a second storage chamber 108a that can accommodate the second strip material 102. The first storage container 107 and the second storage container 108 are supported by the outer cylindrical wall 105 via rolling bearings 107b and 108b, respectively. Thereby, the first storage container 107 and the second storage container 108 are rotatable with respect to the outer cylindrical wall 105.

In the first storage chamber 107a of the first storage container 107, the separated portion of the first strip material 101 is stored in a spiral shape. In the second storage chamber 108a of the second storage container 108, the separated portion of the second strip material 102 is stored in a spiral shape. In FIG. 1, the cross sections of the first strip material 101 stored in a spiral shape in the first storage chamber 107a of the first storage container 107, and the second strip material 102 stored in a spiral shape in the second storage chamber 108a of the second storage container 108 are shown by broken lines.

As shown in FIG. 2, the inner bottom surface 107c of the first storage chamber 107a slopes downward as it moves away from the axis 100X. Specifically, the inner bottom surface 107c of the first storage chamber 107a is sloped over the entire surface so as to descend as it moves away from the axis 100X in the radial direction. The inner bottom surface 107c of the first storage chamber 107a is inclined so as not to contact the lower edge 101d of the first strip material 101 accommodated in the first storage chamber 107a. As shown in FIGS. 1 and 2, the inner bottom surface 107c of the first storage chamber 107a can be referred to as a truncated conical surface.

Similarly, the inner bottom surface 108c of the second storage chamber 108a slopes downward as it moves away from the axis 100X. Specifically, the inner bottom surface 108c of the second storage chamber 108a is sloped over the entire surface so as to descend as it moves away from the axis 100X in the radial direction. The inner bottom surface 108c of the second storage chamber 108a is inclined so as not to contact the lower edge 102d of the second strip material 102 stored in the second storage chamber 108a. The inner bottom surface 108c of the second storage chamber 108a can be referred to as a truncated conical surface.

Figure 3:
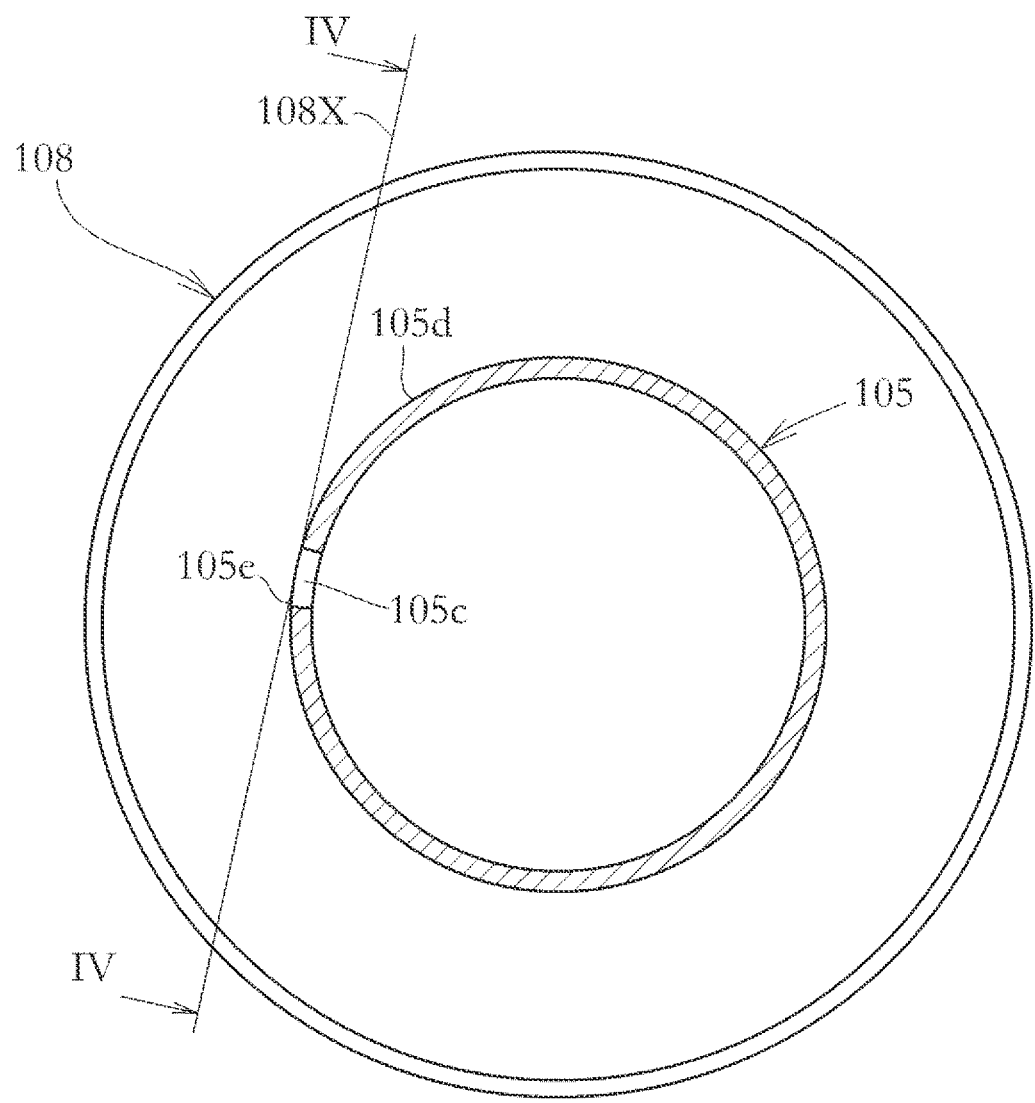
FIG. 3 is a cross-sectional view taken along the line III-III in FIG. 2.
Figure 4:
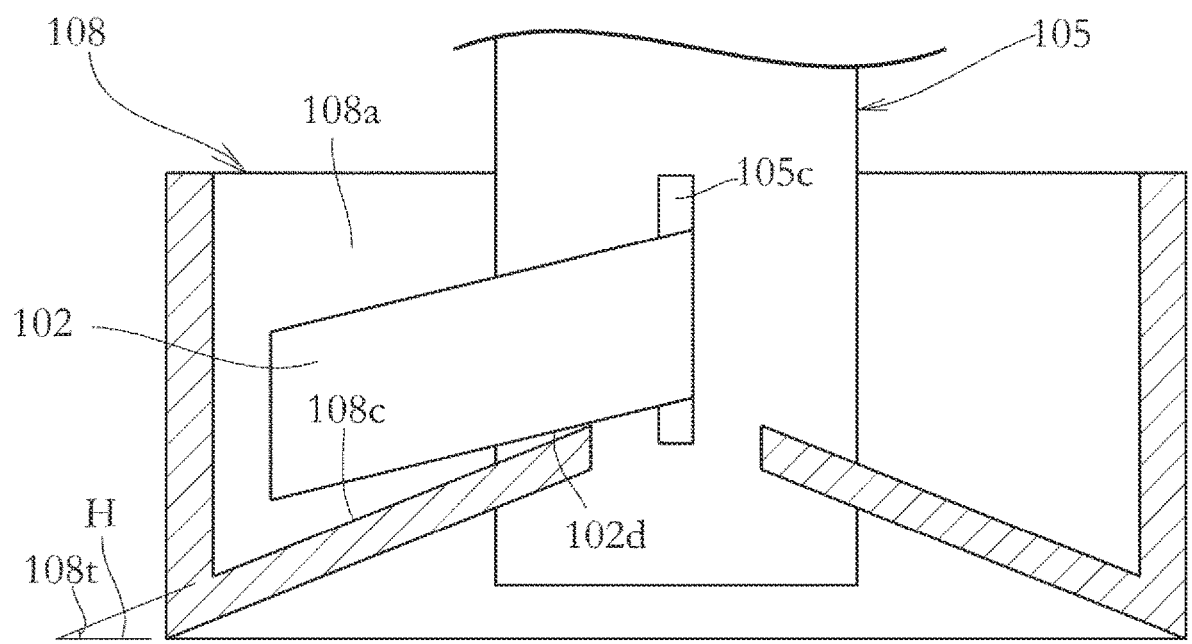
FIG. 4 is a sectional view taken along the line IV-IV in FIG. 3.

FIG. 3 is a sectional view taken along the line III-III in FIG. 2. Referring to FIG. 3, a cutting plane 108X is defined. The cut surface 108X is a surface that makes line contact with the outer peripheral surface 105d of the outer cylindrical wall 105, and is a surface that passes through the outer opening 105e of the second introduction port 105c. To put it simply, the cutting surface 108X is a surface that cuts the second storage container 108 along the tangential direction of the second introduction port 105c in plan view. FIG. 4 shows a sectional view taken along the line IV-IV in FIG. 3. As shown in FIG. 4, the inclination angle 108t of the inner bottom surface 108c of the second storage chamber 108a at the cut surface 108X is defined as the angle formed by the inner bottom surface 108c and the horizontal surface H. Here, with reference to FIG. 2, the lead angle 100t of the helical structure of the cylindrical structure 100A is defined as the angle formed by the lower edge 101d of the first strip material 101 in the cylindrical structure 100A and the horizontal surface H. Ru. The angle between the lower edge 101d of the first strip material 101 and the horizontal surface H in the cylindrical structure 100A is equal to the angle between the lower edge 102d of the second strip material 102 and the horizontal surface H in the cylindrical structure 100A. In this embodiment, the inclination angle 108t is set larger than the lead angle 100t. As a result, as shown in FIG. 4, it is possible to reliably secure a gap between the lower edge 102d and inner bottom surface 108c of the second strip material 102 discharged from the second introduction port 105c to the second storage chamber 108a of the second storage container 108 along the cut surface 108X.

Returning to FIG. 1, a tip holding member 109 is provided at the upper end of the cylindrical structure 100A. That is, this tip holding member 109 holds together the upper ends of the first strip material 101 and the second strip material 102 that constitute the cylindrical structure 100A. Therefore, the tip holding member 109 rotates together with the cylindrical structure 100A. In order to obtain a non-rotating tip acting portion at the upper end of the cylindrical structure 100A, a tip acting member 109b rotatably attached to the tip holding member 109 via a bearing member 109a is provided as shown in the illustrated example. Good too.

Continuing to refer to FIG. 1, a prime mover 110 made of an electric motor or the like is fixed to the base 103. The rotating shaft of the prime mover 110 is fixed to a pulley 111, and a drive belt 112 made of a toothed belt or the like is stretched between the pulley 111 and the cylindrical structure 100A. The portion where the drive belt 112 spans the cylindrical structure 100A is a portion where the inner guide member 104 protrudes upward from the upper end of the outer cylindrical wall 105. As a result, the driven parts of the first strip material 101 and the second strip material 102 driven by the drive belt 112 are supported from inside by the inner guide member 104, so that it becomes possible to transmit the driving force to the cylindrical structure 100A from the drive belt 112 without any trouble.

In the spiral advance/retreat actuation device 100 of the present embodiment described above, the rotational output of the prime mover 110 is transmitted to the cylindrical structure 100A via the pulley 111 and the drive belt 112, so that the cylindrical structure 100A is aligned with the axis. It is rotated around 100x. On the other hand, since the strip material guide unit consisting of the inner guide member 104 and the outer cylindrical wall 105 is fixed to the base 103, the rotation of the cylindrical structure 100A causes the separated portions of the first strip material 101 and the second strip material 102 arranged in the first storage chamber 107a and the second storage chamber 108a are rolled up by the strip material guide unit into a cylindrical state, or conversely, the portions of the first strip material 101 and the second strip material 102 constituting the cylindrical structure 100A, which are in a cylindrical state, are rewound by the strip material guide unit to be separated. Then, as the separated portions of the first strip material 101 and the second strip material 102 transition to the cylindrical state, the cylindrical structure 100A is expanded and the tip holding member 109 is paid out upward. It will be done. On the other hand, as the portion in the cylindrical state transitions to the separated state, the cylindrical structure 100A becomes shorter and the tip holding member 109 retreats downward.

In this embodiment, the first strip material 101 and the second strip material 102 partially overlap in the axial direction in the cylindrical structure 100A, and this overlapping state is maintained by the engagement structure, so that it becomes possible to increase the rigidity of the cylindrical structure 100A while ensuring the flexibility of the first strip material 101 and the second strip material 102.

The preferred embodiment of the present disclosure has been described above, and the embodiment has the following features.

That is, as shown in FIGS. 1 and 2, the spiral advance/retreat actuation device 100 has the engagement pin 101a (first engagement structure) and the engagement pin 101b (first engagement structure) located at the upper edge side, and a first strip material 101 extending along the extension direction at the lower edge side, and an engagement hole 102a (second engagement structure) configured to be able to engage and detach from the engagement pin 101a and the engagement pin 101b, and a second strip material 102 having engagement holes 102b (second engagement structure) along the extension direction in the upper edge side portion and the lower edge side portion, respectively, an inner guide member 104 as a strip material guide unit, and It includes an outer cylindrical wall 105 and a strip material storage container 106. The first strip material 101 and the second strip material 102 are each wound spirally around a common axis 100X in a state shifted from each other in the direction of the axis 100X, and are wound on the first strip material 101. The inner surface of the edge side portion and the outer surface of the lower edge side portion of the second strip material 102 partially overlap in the direction of the axis 100X, and the inner surface of the lower edge side portion of the first strip material 101 and the outer surface of the lower edge side portion of the second strip material 102 With the outer surfaces of the upper edge side partially overlapping in the direction of the axis 100X, the engagement pin 101a of the upper edge side of the first strip material 101 and the lower edge side of the second strip material 102 are connected to each other. The engagement hole 102b engages the first strip material 101 and the second strip material 102 with each other in such a manner that they overlap and lock in the surface direction, and the engagement pin 101b on the lower edge side of the first strip material 101 and the engagement hole 102a on the upper edge side of the second strip material 102 engage with each other in such a manner that the first strip material 101 and the second strip material 102 are overlapped and locked in the surface direction. A cylindrical structure 100A is constructed. The inner guide member 104 and the outer cylindrical wall 105 (strip material guide unit) spirally guide the first strip material 101 and the second strip material 102, and also are configured to be able to transition between a separated state in which the first strip material 101 and the second strip material 102 are separated from each other and a cylindrical state in which they constitute the cylindrical structure 100A. The strip material storage container 106 includes a first storage chamber 107a that spirally stores the first strip material 101 that has transitioned from the cylindrical configuration state to the separated state, and a second storage chamber 108a that spirally stores the second strip material 102 that has transitioned from the cylindrical configuration state to the separated state. The inner bottom surface 107c of the first storage chamber 107a and the inner bottom surface 108c of the second storage chamber 108a are inclined to descend as they move away from the axis 100X. According to the above configuration, it is possible to suppress the noise generated when the first strip material 101 and the second strip material 102 transition from the cylindrical state to the separated state.

In the embodiment described above, the inner bottom surface 107c of the first storage chamber 107a and the inner bottom surface 108c of the second storage chamber 108a are inclined to descend as they move away from the axis 100X. However, instead of this, only one of the inner bottom surface 107c of the first storage chamber 107a and the inner bottom surface 108c of the second storage chamber 108a may be inclined so as to descend as it moves away from the axis 100X. Even in this case, it is possible to suppress the noise generated when the first strip material 101 and the second strip material 102 transition from the cylindrical state to the separated state. That is, at least a portion of the noise generated when the first strip material 101 and the second strip material 102 transition from the cylindrical state to the separated state is suppressed. When the inner bottom surface 107c of the first storage chamber 107a is inclined so as to descend as it moves away from the axis 100X, it goes without saying that the noise generated when the first strip material 101 transitions from the cylindrical state to the separated state is suppressed.

Moreover, the inner bottom surface 107c or the inner bottom surface 108c is sloped over the entire surface so as to descend as it moves away from the axis 100X. According to the above configuration, it is possible to effectively suppress the noise generated when the first strip material 101 and the second strip material 102 transition from the cylindrical state to the separated state.

However, instead of this, only the radially inward region of the inner bottom surface 107c may be inclined, and the radially outer region of the inner bottom surface 107*c* may be parallel to the horizontal surface H. Even in this case, it is possible to suppress the noise generated when the first strip material 101 and the second strip material 102 transition from the cylindrical state to the separated state.

Further, as shown in FIGS. 1 and 4, for example, the inner bottom surface 107*c* or the inner bottom surface 108*c* is inclined so as not to come into contact with the corresponding strip material. According to the above configuration, it is possible to reliably suppress the noise generated when the first strip material 101 and the second strip material 102 transition from the cylindrical state to the separated state.

Further, as shown in FIGS. 1 and 2, the strip material guide unit includes an inner guide member 104 that spirally guides the first strip material 101 and the second strip material 102, and an outer cylindrical wall 105 disposed on the outer peripheral side of the inner guide member 104, and that guides the first strip material 101 and the second strip material 102 so that the first strip material 101 and the second strip material 102 can mutually transition between the separated state and the cylinder configuration state. The outer cylindrical wall 105 has a first introduction port 105*b* for introducing the first strip material 101 from the first storage chamber 107*a* into the opposing gap G between the inner guide member 104 and the outer cylindrical wall 105, and a second introduction port 105*c* for introducing the second strip material 102 from the second storage chamber 108*a* into the opposing gap G. According to the above configuration, the strip material guide unit can be realized with a simple configuration.

Further, as shown in FIG. 2, both the first introduction port 105*b* and the second introduction port 105*c* may extend linearly in parallel to the axis 100X. According to the above configuration, the strip material guide unit can be realized with a simple configuration.

Further, as shown in FIGS. 1, 2, and 4, the inner bottom surface 107*c* or the inner bottom surface 108*c* is a truncated conical surface. According to the above configuration, the manufacturing cost of the strip material storage container 106 can be reduced compared to the case where the inner bottom surface 107*c* or the inner bottom surface 108*c* is curved in the cross-sectional view shown in FIG. 2.

Further, as shown in FIGS. 1, 3, and 4, the inner bottom surface 108*c* of the second storage chamber 108*a* at a cut surface 108X obtained by cutting the strip material storage container 106 along the tangential direction of the second introduction port 105*c* in a plan view. The inclination angle 108*t* is larger than the lead angle 100*t* of the cylindrical structure 100A. According to the above configuration, it is possible to reliably suppress the noise generated when the second strip material 102 transitions from the cylindrical state to the separated state. Similarly, the inclination angle of the inner bottom surface 107*c* of the first storage chamber 107*a* at the cut surface of the strip material storage container 106 along the tangential direction of the outer guide surface 105*a* in plan view is the lead angle 100*t* of the cylindrical structure 100A, larger than According to the above configuration, it is possible to reliably suppress the noise generated when the first strip material 101 transitions from the cylindrical state to the separated state.

Further, as an engagement structure for engaging and holding the first strip material 101 and the second strip material 102, not only the engagement pin 101*a* and the engagement pin 101*b* and the engagement hole 102*a* and the engagement hole 102*b*, but any material may be used as long as it can maintain the overlapping state between the first strip material 101 and the second strip material 102. However, in this embodiment, in particular, since the engagement structure is provided on the overlapping surface between the first strip material 101 and the second strip material 102, no protrusion is formed on the outer surface of the cylindrical structure 100A, making it possible to have a compact structure, and the first strip material 101 and the second strip material 102 can be reliably engaged and held.

It should be noted that the above-described spiral advance/retreat actuation device 100 is not limited to the illustrated example described above, and it goes without saying that various changes can be made without departing from the gist of the present disclosure.

For example, in the cylindrical structure 100A, the first strip material 101 and the second strip material 102 are overlapped by the engagement of the engagement pin 101*a* and the engagement pin 101*b* and the engagement hole 102*a* and the engagement hole 102*b*. However, it is sufficient that the first strip material 101 and the second strip material 102 are held releasably by some kind of engagement structure in a mutually overlapping state.

Further, the state of engagement between the first strip material 101 and the second strip material 102 only needs to be locked in either direction within the overlapping planes. For example, corrugated structures corresponding to each other are formed on the inner surface of the first strip material 101 and the outer surface of the second strip material 102 in the direction of the axis 100X, and as a result, the first strip material 101 and the second strip material 102 may be configured to be locked only in the direction of the axis 100X, or corrugated structures corresponding to each other are formed in the direction orthogonal to the axis 100X (direction going around the axis 100X) or in the extending direction of the first strip material 101 and the second strip material 102, and as a result, the first strip material 101 and the second strip material 102 may be configured to be locked only in the direction orthogonal to the axis 100X or in the extending direction of the strip material.

Furthermore, although the above-mentioned engagement structure is provided on the overlapping surface between the first strip material 101 and the second strip material 102, any structure may be used as long as the mating state of the first strip material 101 and the second strip material 102 can be maintained, and for example, it may have a structure that engages at a position away from the overlapping surface.

Further, the first strip material 101 and the second strip material 102 are wound between the inner guide member 104 and the outer cylindrical wall 105 constituting the strip material guide unit and are configured to be guided in a spiral manner. The guiding structure may be any structure as long as it guides the first strip material 101 and the second strip material 102 so that they overlap each other in the axial direction to form a cylindrical structure. For example, a guide structure may be provided in which guide rollers are arranged in a spiral shape on at least one of the inside and outside of the spiral shape.

What is claimed is:

1. A spiral advance/retreat actuation device comprising:
   a first strip material including a first engagement structure along an extension direction in each of an upper edge side portion and a lower edge side portion;
   a second strip material including a second engagement structure along an extension direction in each of an upper edge side portion and a lower edge side portion, the second engagement structure being configured to be removably engageable with the first engagement structure;

a strip material guide unit; and a strip material storage container, wherein:

the first strip material and the second strip material are each wound spirally around a common axis in a state shifted from each other in a direction of the axis to constitute a cylindrical structure in which the first engagement structure in the upper edge side portion of the first strip material and the second engagement structure in the lower edge side portion of the second strip material are engaged with each other in such a manner as to retain the first strip material and the second strip material in a direction of overlapping surfaces and the first engagement structure in the lower edge side portion of the first strip material and the second engagement structure in the upper edge side portion of the second strip material are engaged with each other in such a manner as to retain the first strip material and the second strip material in a direction of overlapping surfaces with an inner surface of the upper edge side portion of the first strip material and an outer surface of the lower edge side portion of the second strip material partially overlapping each other in the direction of the axis and with an inner surface of the lower edge side portion of the first strip material and an outer surface of the upper edge side portion of the second strip material partially overlapping each other in the direction of the axis;

the strip material guide unit is configured to guide the first strip material and the second strip material in a spiral manner, and enable the first strip material and the second strip material to transition between a separated state in which the first strip material and the second strip material are separated from each other and a cylindrical configuration state in which the first strip material and the second strip material constitute the cylindrical structure;

the strip material storage container includes a first storage chamber that spirally stores the first strip material that has transitioned from the cylindrical configuration state to the separated state, and a second storage chamber that spirally stores the second strip material that has transitioned from the cylindrical configuration state to the separated state; and an inner bottom surface of at least one of the first storage chamber and the second storage chamber is inclined downward as the inner bottom surface extends away from the axis.

2. The spiral advance/retreat actuation device according to claim 1, wherein the inner bottom surface is inclined so as not to come into contact with a corresponding strip material.

3. The spiral advance/retreat actuation device according to claim 1, wherein:

the strip material guide unit includes an inner guide member that guides the first strip material and the second strip material in a spiral manner, and an outer cylindrical wall disposed on an outer peripheral side of the inner guide member to guide the first strip material and the second strip material so as to enable the first strip material and the second strip material to transition between the separated state and the cylindrical configuration state; and the outer cylindrical wall has a first introduction port for introducing the first strip material from the first storage chamber into an opposing gap between the inner guide member and the outer cylindrical wall, and a second introduction port for introducing the second strip material from the second storage chamber into the opposing gap.

4. The spiral advance/retreat actuation device according to claim 3, wherein both the first introduction port and the second introduction port extend linearly in parallel with the axis.

5. The spiral advance/retreat actuation device according to claim 3, wherein an inclination angle of the inner bottom surface of the first storage chamber in a sectional surface of the strip material storage container taken along a direction of a tangent to the first introduction port in plan view is larger than a lead angle of the cylindrical structure, or an inclination angle of the inner bottom surface of the second storage chamber in a sectional surface of the strip material storage container taken along a direction of a tangent to the second introduction port in plan view is larger than the lead angle of the cylindrical structure.

* * * * *